United States Patent [19]
Tuell

[11] Patent Number: 6,162,027
[45] Date of Patent: Dec. 19, 2000

[54] FLUID DRIVEN PUMP AND PORTIONING CHECK VALVE

[75] Inventor: Elden C. Tuell, Topeka, Kans.

[73] Assignee: Shurflo Pump Manufacturing Co., Santa Ana, Calif.

[21] Appl. No.: 09/129,592

[22] Filed: Aug. 5, 1998

[51] Int. Cl.[7] .................................................. F04B 43/10
[52] U.S. Cl. ........................................ 417/394; 417/383
[58] Field of Search ................................ 417/394, 383; 137/540, 516.25; 92/93

[56] References Cited

U.S. PATENT DOCUMENTS

| | | | |
|---|---|---|---|
| 3,048,121 | 8/1962 | Sheesley | 103/152 |
| 3,194,170 | 7/1965 | Ulbing | 103/152 |
| 3,347,461 | 10/1967 | Thorburn | 236/79 |
| 3,526,223 | 9/1970 | Curtis | 128/142.5 |
| 3,630,644 | 12/1971 | Bellhouse et al. | 417/389 |
| 3,782,410 | 1/1974 | Steuby | 137/496 |
| 3,877,838 | 4/1975 | Choy | 417/394 |
| 4,111,613 | 9/1978 | Sperry | 417/394 |
| 4,230,147 | 10/1980 | Booth et al. | 137/504 |
| 4,250,872 | 2/1981 | Tamari | 128/1 D |
| 4,257,751 | 3/1981 | Kofahl | 417/394 |
| 4,301,967 | 11/1981 | Hunter | 239/99 |
| 4,474,540 | 10/1984 | Bonastia et al. | 417/63 |
| 4,722,731 | 2/1988 | Vailancourt | 604/122 |
| 5,090,446 | 2/1992 | Hunter et al. | 137/540 |

FOREIGN PATENT DOCUMENTS

| | | |
|---|---|---|
| 0636379 | of 1998 | European Pat. Off. |
| 1439153 | of 0000 | France |
| 2488948 | 2/1982 | France |
| 2522075 | 8/1983 | France |
| 2621390 | 7/1989 | France |
| 2655123 | 5/1991 | France |

*Primary Examiner*—Henry C. Yuen
*Assistant Examiner*—Mahmoud M Gimie
*Attorney, Agent, or Firm*—Stout, Uxa, Buyan & Mullins; Frank J. Uxa

[57] ABSTRACT

A pump includes a housing, an enlarged block, an inlet fluid conduit, an outlet fluid conduit and a flexible diaphragm. The housing defines a chamber having an inlet and a spaced apart outlet. The enlarged block is located in the chamber and has a first region and a spaced apart second region. The inlet fluid conduit extends into the chamber, terminates at or near the first region of the enlarged block and has at least one fluid inlet aperture in the chamber. The outlet fluid conduit extends into the chamber, terminates at or near the second region of the enlarged block and has at least one fluid outlet aperture in the chamber. The flexible diaphragm is located in the chamber and is moveable between a first position in which a working fluid from the inlet fluid conduit is prevented from passing toward the outlet fluid conduit and a second position in which the working fluid from the inlet fluid conduit is allowed to pass toward the outlet fluid conduit.

21 Claims, 1 Drawing Sheet

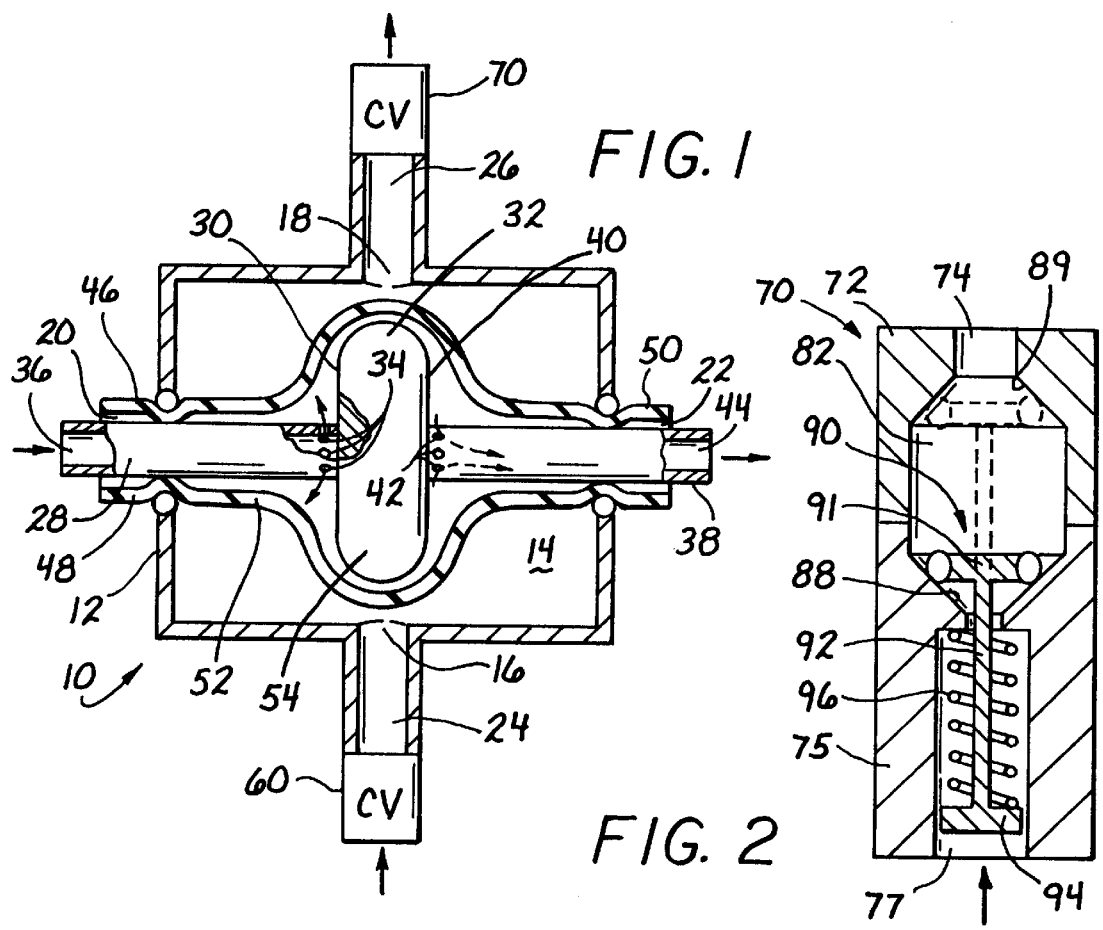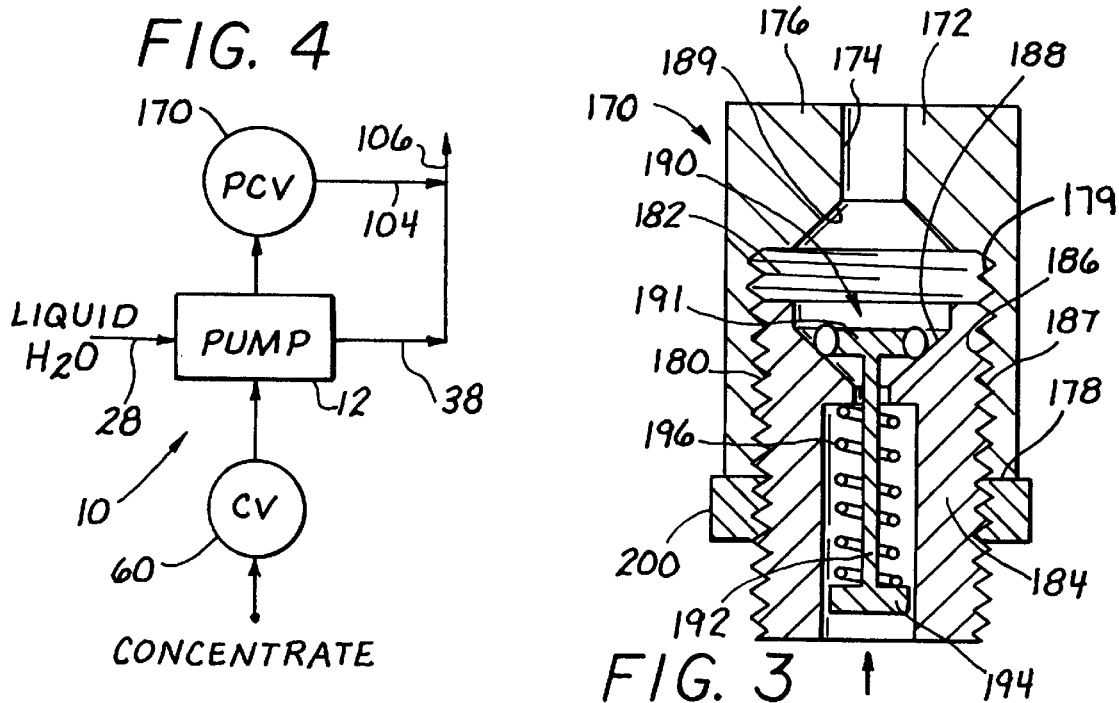

FLUID DRIVEN PUMP AND PORTIONING CHECK VALVE

BACKGROUND OF THE INVENTION

The present invention relates to fluid driven pumps and portioning check valves, for example, useful with such pumps. More particularly, the invention relates to fluid driven pumps which employ flexible diaphragms to obtain pumping action and to portioning, preferably adjustable portioning, check valves useful to control fluid flow, such as the flow of fluid pumped by the present pumps.

Fluid driven pumps are well known in the art for pumping other fluids. For example, a working fluid, such as compressed air, can be used to power a piston or expand a diaphragm thereby creating a pumping force which can be used to pump another fluid. In many instances, such pumps require that the flow rate of the working fluid be controlled so as to control the flow rate of the pumped fluid. Such control mechanisms can be relatively complex and can require relatively frequent maintenance.

In many instances, a concentrate material is pumped at a set or controlled rate after which it is mixed with a set amount of diluent, for example, liquid water, to provide a composition which is used for a valuable purpose, such as feeding or otherwise treating plants, as well as many other applications. Systems for producing such mixed compositions often include relatively sophisticated metering pumps to insure that the proper amount of concentrate is combined with the desired amount of diluent.

It would be advantageous to provide fluid driven pumps which are straightforward and effective, such as pumps for concentrates useful in combination with diluents.

SUMMARY OF THE INVENTION

New fluid driven pumps, and portioning check valves, for example, useful with such pumps, have been discovered. In addition, methods for pumping fluids and for producing mixed compositions are also provided. The present pumps are straightforward in design and construction, are easy to use and control and require reduced maintenance. For example, the flow rates of the pumped fluids preferably are controlled without varying the flow rate of the working fluid. The present portioning check valves are straightforward in construction, easy to produce and use and very effectively control the flow rate of fluid therethrough. Such portioning check valves are of particular use in combination with the present pumps. The present methods of pumping fluid and producing combined or mixed compositions take advantage of the present pumps, and preferably the present portioning check valves, to very effectively produce compositions with a controlled chemical makeup useful for the application desired. Such methods are very convenient to practice, achieve excellent results and use equipment which is straightforward.

In one broad aspect of the present invention, pumps are provided which comprise a housing, an enlarged block, an inlet fluid conduit, an outlet fluid conduit and a flexible diaphragm. The housing defines a chamber having an inlet and a spaced apart outlet. The enlarged block is located in the chamber and has a first region and a spaced apart second region. The inlet fluid conduit extends into the chamber and terminates at or near the first region of the enlarged block. The inlet fluid conduit has at least one fluid aperture in the chamber, preferably in proximity to the first region of the enlarged block. The outlet fluid conduit extends into the chamber and terminates at or near the second region of the enlarged block. The outlet fluid conduit has at least one fluid outlet aperture in the chamber, preferably in proximity to the second region of the enlarged block.

The flexible diaphragm is located in the chamber and is moveable between a first position and a second position. In the first position of the flexible diaphragm, the working fluid from the inlet fluid conduit is prevented from passing toward the outlet fluid conduit. In the second position, the working fluid from the inlet fluid conduit is allowed to pass toward the outlet fluid conduit. The movement of the flexible diaphragm between the first and second positions in the chamber is believed to create the pumping action which allows fluid passing into the chamber through the inlet to be pumped out of the chamber through the outlet.

The flexible diaphragm preferably is moveable from the first position to the second position in response to working fluid flowing from the fluid inlet aperture or apertures.

The present pumps preferably include an inlet passage in fluid communication with the inlet and an outlet passage in fluid communication with the outlet. An inlet check valve is located in the inlet passage and is adapted to prevent fluid being pumped from exiting the chamber. An outlet check valve is located in the outlet passage is adapted to prevent pumped fluid from entering the chamber. The combination of the inlet and outlet check valves, together with the movement of the flexible diaphragm between the first and second positions, is very effective in providing a positive flow of pumped fluid from the inlet passage upstream of the inlet check valve through the chamber and into the outlet passage downstream of the outlet check valve.

In a very useful embodiment, the flexible diaphragm, preferably made of polymeric material, such as polyethylene, polyurethane, latex, other thermoplastic polymeric materials and the like, is stretched over a portion of the enlarged block. In one particularly useful embodiment, the flexible diaphragm substantially surrounds the enlarged block.

The first region of the enlarged block preferably is a first end of the enlarged block and the second region of the enlarged block preferably is a substantially opposing second end of the enlarged block. The flexible diaphragm more preferably is stretched over a portion of the enlarged block between the first and second ends. It is very effective to have the flexible diaphragm sealingly secured to both the inlet fluid conduit and the outlet fluid conduit. Such arrangement provides very effective pumping action as the flexible diaphragm cycles between the first and second positions.

Preferably, the pump includes a plurality of fluid inlet apertures and a plurality of fluid outlet apertures. More preferably, the fluid inlet apertures are substantially equally spaced apart around the inlet fluid conduit and the fluid outlet apertures are substantially equally spaced apart around the outlet fluid conduit. This configuration provides that the diaphragm is moved very consistently between the first and second positions, for example, so that a very uniform pumping action is achieved.

In one very useful embodiment, the configuration of the outlet check valve is adjustable to control the flow rate of pumped fluid. In a specific embodiment, the outlet check valve includes a valve housing, a valve seat, a spaced apart additional valve seat and a valve element. The valve housing, valve seat and additional valve seat together define a valve chamber having a valve inlet and a valve outlet. The valve element is adapted to move away from the valve seat to allow pumped fluid to leave the chamber of the pump and to contact the valve seat to prevent pumped fluid from the valve chamber from entering the chamber of the pump. The additional valve seat is positioned so that after the valve element moves a certain distance away from the valve seat, referred to the travel distance of the valve element, it contacts the additional valve seat and prevents fluid from leaving the valve chamber through the valve outlet. The valve is structured or adapted so that the flow of pumped fluid causes the valve element to move the travel distance.

The outlet check valve preferably further comprises a bias member adapted to contact the valve element and to bias the valve element to contact the valve seat. In other words, the outlet check valve is biased in the closed position. The travel distance of the valve element preferably is adjustable to control the flow rate of pumped fluid out of the chamber of the pump. In a particularly effective embodiment the flow rate of pumped fluid out of the chamber of the pump is directly proportional to the travel distance. That is, the longer the travel distance of the valve element in the outlet check valve, the larger the net flow rate of fluid out of the chamber of the pump.

In another broad aspect of the present invention methods for pumping a fluid are provided. Such methods comprise passing a fluid to be pumped to the inlet of a pump in accordance with the present invention. A working fluid, preferably a working liquid, is passed through the inlet fluid conduit at a sufficient rate to cause the flexible diaphragm to cycle between the first position and the second position. This causes the working fluid to flow into the outlet fluid conduit and pumped fluid to pass out of the chamber through the outlet.

In a very useful embodiment, the working fluid is an aqueous liquid, for example, municipal water, potable water, other aqueous liquid materials and the like. However, it should be understood that any suitable working fluid, preferably working liquid, may be employed in accordance with the present invention. The flow rate of the working fluid can be maintained substantially constant. Even with a constant working fluid flow rate, by adjusting the travel distance in the outlet check valve, the flow rate of pumped liquid can be varied, as desired. This is one important advantage of the present invention since the flow rate of the working fluid need not be varied or adjusted in order to control the flow rate of the pumped liquid.

Any suitable fluid may be pumped using the present pump and/or system to provide pumped fluid for any suitable application. The pumped fluids, for example, liquids, can be used in a great number of applications. Gaseous materials can also be pumped using the present invention.

In one embodiment, the pumped fluid passed out of the chamber through the outlet is combined with the working fluid from the outlet fluid conduit to form a combined material or composition. Because the flow rates of both the working fluid and the pumped fluid preferably are substantially constant at predetermined values, the final combined material or composition has a predetermined chemical makeup. The portioning outlet check valve, described herein, used in combination with the present pump, very effectively provides for control of the flow rate of the pumped fluid so that the chemical makeup of the final combined composition can be predetermined. Thus, the chemical makeup of the final combined material is as desired and is obtained with reduced complexity relative to prior art systems involving relatively complex chemical metering pumps. Further, because the flow of the working fluid, which ends up being the diluent, is used to pump the concentrate, that is the pumped fluid from the chamber, a unified system is provided.

In another broad aspect of the present invention, check valves, for example, useful as outlet check valves useful with the present pumps, are provided. Such valves include a valve housing, a valve seat, a valve element and an additional valve seat. The valve seat is positioned and adapted to define, together with the valve housing and the additional valve seat, a valve chamber having an inlet and a spaced apart outlet. The valve element is positioned and adapted to be moveable within the valve chamber over a travel distance between a first position in which the valve element contacts the valve seat to prevent fluid flow through the inlet and a second position in which the valve element contacts the additional valve seat to prevent fluid flow through the outlet. The valve is structured so that the travel distance is adjustable and to allow fluid flow through the inlet when the valve element is moving away from the valve seat.

In one useful embodiment, the size of the valve chamber is adjustable. The relative position of the valve seat and the additional valve seat is adjustable, for example, to adjust the size of the valve chamber and/or the travel distance of the valve element. In a very useful embodiment, the present check valves further comprise a bias member adapted to contact the valve element and to bias the valve element to contact the valve seat.

As noted above, the valves described immediately above are particularly useful when used as outlet check valves in combination with the present pumps.

Each and every combination of two or more features described herein is included within the scope of the present invention provided that such features are not mutually inconsistent.

These and other aspects and advantages of the present invention are apparent in the following detailed description and claims, particularly when considered in conjunction with the accompanying drawings in which like parts bear like reference numerals.

BRIEF DESCRIPTION OF THE DRAWINGS

FIG. 1 is a schematic illustration, partly in cross-section, of one embodiment of a pump in accordance with the present invention.

FIG. 2 is a side view in cross-section of one embodiment of an outlet check valve useful with the pump illustrated in FIG. 1.

FIG. 3 is a side view in cross-section of another embodiment of an outlet check valve useful with the pump illustrated in FIG. 1.

FIG. 4 is a illustration of a flow system used in producing a mixed composition using the pump illustrated in FIG. 1 and the outlet check valve illustrated in FIG. 3.

DETAILED DESCRIPTION OF THE DRAWINGS

Referring now to the drawings and in particular FIG. 1, a pump in accordance with the present invention, shown generally at 10, includes a housing 12 defining a chamber 14, an inlet 16 and an outlet 18. The housing also includes a first through opening 20 on a generally opposing second through opening 22. Through openings 20 and 22 provide access to the chamber from outside the housing. Further, the housing defines an inlet passage 24 in fluid communication with the inlet 16 and chamber 14 and an outlet passage 26 in fluid communication with the outlet 18 and the chamber.

An inlet fluid conduit 28 extends from a source of liquid water through first through opening 20 and terminates in chamber 14. Inlet fluid conduit 28 terminates at and is secured to the first end 30 of enlarged block member 32. A series of inlet conduit apertures 34 are equally spaced around the periphery of inlet fluid conduit 28 and provide flow paths for liquid water passing out of the hollow space 36 defined by the inlet fluid conduit.

An outlet fluid conduit 38 extends from outside the chamber 14 through second through opening 22 and terminates at and is secured to the second end 40 of block member 32. First end 30 and second end 40 of block member 32 are generally opposed to each other, as shown in FIG. 1. Outlet fluid conduit 38 includes a series of outlet conduit apertures or flow paths 42 equally spaced around the periphery of the outlet fluid conduit. Outlet conduit apertures or flow paths 42 provide flow paths for water to pass into the hollow space 44 of outlet fluid conduit 38 to allow water to be removed from chamber 14.

An elongated flexible, tubular diaphragm 46 is positioned about the inlet fluid conduit 28, block member 32 and outlet fluid conduit 38, as shown in FIG. 1. In particular, a first end region 48 of diaphragm 46 is located about inlet fluid conduit 28 outside the chamber 14. The housing 12, diaphragm 46 and inlet fluid conduit 28 are structured so as to seal the chamber 14 at the first through opening 20. Similarly, diaphragm 46 includes a second end region 50 which is located about outlet fluid conduit 38 outside the chamber 14. The housing 12, diaphragm 46 and outlet fluid conduit 38 are structured so as to seal the chamber 14 at the second through opening 22. These seals may include O-rings, and/or other conventional seal assemblies. Such seals at the first through opening 20 and the second through opening 22 are effective to prevent the working fluid, that is liquid water from the first inlet fluid conduit 28, from leaving the chamber 14 other than through the hollow space 44 of outlet fluid conduit 38. In addition, such seals are effective to insure that the pumped liquid leaves chamber 14 through outlet 18 and outlet passage 26.

The portion 52 of the diaphragm 46 located within the chamber 14 is positioned about inlet fluid conduit 28, block member 32 and outlet fluid conduit 38. In particular, diaphragm portion 52 is stretched over the central periphery 54 of the block member 32 which extends between the first end 30 and the second end 40. That is to say, with no liquid water passing through the inlet fluid conduit 28, the diaphragm portion 52 is maintained taut against the central periphery 54 of the block member 32. The central periphery 54 of block member 32 may have any suitable configuration provided that the block member functions as described herein. The central periphery 54 can have a curved profile between first end 30 and second end 40, for example, as illustrated in FIG. 1, or can have a flat (straight line) profile or a combination flat and curved profile between the first and second ends. The diaphragm 46 may be made of any suitable material which has sufficient flexibility and durability to perform in accordance with the present invention. Examples of such materials of construction useful for diaphragm 46 include polyethylene, polyurethane, latex and the like.

The combination of inlet fluid conduit 28, block member 32 and outlet fluid conduit 38, together with diaphragm 46 and housing 12, is configured so that the only possible flow path for the working fluid, liquid water, passing through hollow space 36 into chamber 14 out of the chamber is by passage from inlet conduit flow paths 34, around central periphery 54, into outlet conduit flow paths 42 and through hollow space 44. In addition, the block member 32 as shown in FIG. 1, has a generally right circular cylindrical configuration. However, the shape of block member 32 can be varied to any suitable configuration. Preferably, the block member 32 has a larger cross-section than either the inlet fluid conduit 28 or the outlet fluid conduit 38. In other words, the block member 32 is enlarged, substantially perpendicular to the general direction of flow of the working fluid through pump 10, relative to either the inlet fluid conduit 28 or the outlet fluid conduit 38.

Inlet check valve 60 is located in inlet passage 24 and is effective to prevent fluid being pumped by pump 10 from exiting chamber 14. Inlet check valve 60 may be of any suitable construction effective to perform the function described herein. Conventional check valves which are readily available may be employed for this purpose.

An outlet check valve 70 is located in the outlet passage 26. Outlet check valve 70 is effective to prevent fluid which has been pumped by pump 10 from entering, that is re-entering, chamber 14. Any suitable check valve effective to perform the function described herein, for example, of conventional design, may be employed as outlet check valve 70.

With specific reference to FIG. 2, outlet check valve 70 includes a first hollow housing member 72 defining an outlet 74 and a second hollow housing member 75 defining an inlet 77. First and second housing members 72 and 75 abut or border each other, and form an enlarged hollow space 82. Second housing member 75 includes a valve seat 88, while first housing member 72 includes an additional valve seat 89. In addition, a valve element 90 is coupled to second housing member 75. This valve element 90 includes a poppet 91, an elongated shaft 92, a back stop 94 and a spring 96. Spring 96 is biased to provide a force to maintain poppet 90 in contact with valve seat 88. In other words, valve 70 is biased to be in the closed position. When flow occurs, in the direction shown by the arrow in FIG. 2, the poppet 91 moves away from the valve seat 88 to allow such flow.

Pump 10 functions as follows. A liquid concentrate material, for example, a fertilizer concentrate, a herbicide concentrate or the like, is provided to the inlet passage 24. Liquid water at a constant pressure and constant flow rate, for example, from a municipal water supply, is passed into hollow space 36 of inlet fluid conduit 28. Although liquid water is illustrated as the working fluid, any other suitable fluid, preferably liquid, may be employed as the working fluid. In addition, although a liquid concentrate is illustrated as being pumped, any suitable fluid, for example, liquid water, aqueous solutions, and other liquids and fluids, may be pumped in accordance with the present invention. Over time the working fluid is passed into chamber 14 from inlet fluid conduit 28 and out of the chamber through outlet fluid conduit 38. This flow of working fluid creates a pumping action, for example, as described herein, which causes liquid concentrate to be pumped by pump 10.

Without wishing to limit the invention to any particular theory of operation, it is believed that the flow of liquid water in inlet fluid conduit 28 causes liquid water to pass out of inlet conduit flow paths 34 which, in turn, causes the diaphragm 46 to move away from the block member 32, in particular away from the central periphery 54 of the block member. This movement of the diaphragm 46 away from the block member 32 relieves the pressure of water by passing water through the outlet conduit flow paths 42. This reduced pressure causes the diaphragm 46 to return toward its initial position, that is, stretched tautly or tightly against the central periphery 54 of block member 32.

The liquid water that passes between the diaphragm 46 and the block member 32 during the time that the diaphragm is separated from the block member passes toward, and eventually into, the outlet conduit flow paths 42 and then out of chamber 14 through hollow space 44 of outlet fluid conduit 38.

The movement of diaphragm 46 between a position in which substantially no water from flow paths 34 passes around the central periphery 54 of block member 32 (the first position of the diaphragm) and a position in which such liquid water is allowed to pass around the central periphery of the block member (the second position of the diaphragm) is believed to create a pumping action within chamber 14. The diaphragm 46 cycles between its first position and its second position quite frequently, for example, at least one time per second.

With the diaphragm 46 in the first position, inlet check valve 60 is open and liquid concentrate is allowed to pass through inlet passage 24 into chamber 14. Outlet check valve 70 is closed with the diaphragm 46 in the first position, thus preventing pumped fluid downstream from the outlet check valve from returning to the chamber 14.

With diaphragm 46 in the second position, inlet check valve 60 is closed preventing any liquid concentrate in chamber 14 from exiting the chamber through the inlet passage 24. With diaphragm 46 in the second position, outlet check valve 70 moves away from valve seat 88 to allow pumped fluid from chamber 14 and outlet passage 26 to leave the pump 10. The poppet 91 moves away from valve seat 88 and into contact with additional valve seat 89 (shown in shadow lines in FIG. 2). With poppet 91 in contact with additional valve seat 89 no additional pumped fluid is allowed to flow into outlet 74. In this manner, the flow rate of the pumped fluid is controlled.

In a particularly useful embodiment, the outlet check valve is adjustable so as to control the flow rate of the pumped concentrate from the pump 10.

FIG. 3 illustrates an embodiment of an outlet check valve, shown generally at 170, which is adjustable.

With reference to FIG. 3, outlet check valve 170 includes a hollow housing 172 defining an additional valve seat 189 and an outlet 174 at one end 176 and an enlarged opening at the second, opposing end 178. The inner sidewall 179 of housing 172 near the second end 178 includes threads 180. The housing 172 is configured to form an enlarged hollow space 182. A movable valve seat member 184 is positioned in the enlarged hollow space 182 and extends outwardly beyond the second end 178 of housing 172. Valve seat member 184 includes an outer sidewall 186 which includes threads 187 sized and adapted to matingly engage the threads 180 of the inner sidewall 179 of housing 172. Valve seat member 184 includes a valve seat 188. In addition, a valve element 190 is coupled to movable valve seat member 184. This valve element 190 includes a poppet 191, an elongated shaft 192, a back stop 194 and a spring 196. Spring 196 is biased to provide a force to maintain poppet 190 in contact with valve seat 188. In other words, valve 170 is biased to be in the closed position.

A lock nut 200 is provided to lock or maintain the position of the movable valve seat member 184 relative to a the housing 172.

When flow occurs, in the direction shown by the arrow in FIG. 3, the poppet 191 moves away from the valve seat 188 to allow such flow. The poppet 191 moves into contact with additional valve seat 188. With poppet 191 in contact with additional valve seat 189, no further pumped fluid is allowed to pass across the poppet into outlet 174. The distance between the valve seat 188 and the additional valve seat 189 is referred to as the travel distance of the poppet 191. By adjusting the position of movable valve seat member 184 relative to housing 172 (by engaging or disengaging threads 180 and 187), the travel distance can be adjusted and the flow rate of the pumped fluid can be controlled and adjusted.

With regard to the operation of pump 10, the larger the travel distance of poppet 191, the larger the net flow rate of pumped fluid from chamber 14 across outlet check valve 170. Thus, by controlling the position of the movable valve seat member 184 relative to the housing 172, the travel distance can be adjusted and the flow rate of the pumped fluid from pump 10 can be very conveniently, easily and effectively controlled.

Using such a flow control system, the ratio of working fluid, that is liquid water passing into inlet fluid conduit 28, to the amount of concentrate leaving chamber 14 across outlet check valve 170 can be very effectively controlled.

FIG. 4 illustrates one very useful application of the present invention. In FIG. 3, a working fluid, that is, water from inlet fluid conduit 28, is used to create pumping action in pump housing 12, as described herein. The liquid water exits pump housing 12 in outlet fluid conduit 38. Concentrate to be pumped passes across inlet check valve 60 and into pump housing 12, and out of pump housing 12 across outlet check valve 170 into line 104. The water in outlet fluid conduit 38 is combined with the pumped concentrate in line 104 to form a final composition in line 106. This final composition in line 106 can then be transported for use, as desired. Because the relative amounts of liquid water in outlet fluid conduit 38 and of pumped concentrate in line 104 are controlled or predetermined, for example, by controlling the travel distance of poppet 191, the chemical make-up of the final composition in line 106 is as desired. This desired composition is produced without complex metering pumps, flow meters or other relatively sophisticated equipment.

The use of the present pump 10, particularly in combination with the portioning outlet check valve 170 as described herein, very effectively produces a combined composition having a known chemical make-up, as desired. Such chemical composition is produced using the present system which is straightforward, easy to operate and provides very effective results.

While this invention has been described with respect to various specific examples and embodiments, it is to be understood that the invention is not limited thereto and that it can be variously practiced within the scope of the following claims.

What is claimed is:

1. A pump comprising:

a housing defining a chamber having an inlet and a spaced apart outlet;

an enlarged block located in the chamber and having a first region and a spaced apart second region;

an inlet fluid conduit extending into the chamber, terminating at or near the first region and having at least one fluid inlet flow path in the chamber;

an outlet fluid conduit extending into the chamber, terminating at or near the second region and having at least one fluid outlet flow path in the chamber; and a flexible diaphragm located in the chamber and being movable between a first position in which a working fluid from the inlet fluid conduit is prevented from passing toward the outlet fluid conduit and a second position in which the working fluid from the inlet fluid conduit is allowed to pass toward the outlet fluid conduit.

2. The pump of claim 1 wherein the flexible diaphragm is movable between the first and second positions in response to working fluid flowing from the at least one fluid inlet flow path.

3. The pump of claim 1 which includes an inlet passage in fluid communication with the inlet and an outlet passage in fluid communication with the outlet, an inlet check valve in the inlet passage adapted to prevent fluid being pumped from exiting the chamber and an outlet check valve in the outlet passage adapted to prevent pumped fluid from entering the chamber.

4. The apparatus of claim 3 wherein the configuration of the outlet check valve is adjustable to control the flow rate of pumped fluid.

5. The apparatus of claim 3 wherein the outlet check valve includes a valve housing, a valve seat and a spaced apart additional valve seat which together define a valve chamber having a valve inlet and a spaced apart valve outlet, and a valve element which moves away from the valve seat to allow pumped fluid to leave the chamber, which contacts the valve seat to prevent pumped fluid from the valve chamber from entering the chamber and which contacts the additional valve seat to prevent fluid from leaving the valve chamber through the valve outlet.

6. The apparatus of claim 5 which further comprises a bias member adapted to contact the valve element and to bias the valve element to contact the valve seat.

7. The apparatus of claim 5 in which the distance between the valve seat and the additional valve seat is adjustable to control the flow rate of pumped fluid out of the chamber.

8. The pump of claim 1 wherein the flexible diaphragm is stretched over a portion of the enlarged block.

9. The pump of claim 1 wherein the first region is a first end of the enlarged block and the second region is a substantially opposing second end of the enlarged block.

10. The pump of claim 9 wherein the flexible diaphragm is stretched over a portion of the enlarged block between the first and second ends.

11. The pump of claim 1 wherein the flexible diaphragm is sealingly secured to both the inlet fluid conduit and the outlet fluid conduit.

12. The apparatus of claim 1 which includes a plurality of fluid inlet flow paths and a plurality of fluid outlet flow paths.

13. The apparatus of claim 12 wherein the fluid inlet flow paths are substantially equally spaced apart around the inlet fluid conduit and the fluid outlet flow paths are substantially equally spaced apart around the outlet fluid conduit.

14. A method of pumping a fluid comprising the steps of:
providing a pump comprising a housing defining a chamber having an inlet and a spaced apart outlet, an enlarged block located in the chamber and having a first region and a spaced second region, an inlet fluid conduit extending into the chamber, terminating at or near the first region and having at least one fluid inlet flow path in the chamber, an outlet fluid conduit extending into the chamber, terminating at or near the second region and having at least one outlet flow path in the chamber, and a flexible diaphragm located in the chamber and being movable between a first position in which a working fluid from the inlet fluid conduit is prevented from passing toward the outlet fluid conduit and a second position in which the working fluid from the inlet fluid conduit is allowed to pass toward the outlet fluid conduit;
passing a fluid to be pumped to the inlet of the pump; and
passing working fluid through the inlet fluid conduit at a sufficient rate to cause the flexible diaphragm to cycle between the first position and the second position, thereby causing working fluid to flow in the outlet fluid conduit and pumped fluid to pass out of the chamber through the outlet.

15. The method of claim 14 wherein the passing working fluid step comprises passing working liquid through the inlet fluid conduit at a sufficient rate to cause the flexible diaphragm to cycle between the first position and the second position, thereby causing working liquid to flow in the outlet fluid conduit and pumped fluid to pass out of the chamber through the outlet.

16. The method of claim 14 which further comprises:
combining the pumped fluid passed out of the chamber through the outlet with the working fluid from the outlet fluid conduit to form a combined material.

17. The method of claim 16 wherein the combining step is effective to form the combined material with a controlled composition.

18. A pump comprising:
a housing defining a chamber;
an inlet passage in fluid communication with the chamber;
an outlet passage in fluid communication with the chamber;
an inlet check valve in the inlet to prevent fluid being pumped to exit the chamber;
an outlet check valve in the outlet to prevent pumped fluid from entering the chamber;
an enlarged block located in the chamber and having a first end and a substantially opposing second end;
an inlet conduit extending into the chamber and terminating at or near the first end of the enlarged block;
at least one inlet flow path in the inlet conduit in the chamber;
an outlet conduit extending into the chamber and terminating at or near the second end of the enlarged block;
at least one outlet flow path in the outlet conduit in the chamber; and
a flexible diaphragm surrounding the enlarged block, at least a portion of the inlet conduit in the chamber and at least a portion of the outlet conduit in the chamber and having a first position in which a working fluid from the inlet conduit is prevented from flowing into the outlet conduit and a second position in which the working fluid from the inlet conduit is allowed to flow into the outlet conduit.

19. A valve comprising:
a valve housing;
a valve seat and a spaced apart additional valve seat positioned and adapted to define, together with the valve housing, a valve chamber having an inlet and a spaced apart outlet; and
a valve element positioned and adapted to be movable within the valve chamber over a travel distance between a first position in which the valve element contacts the valve seat to prevent fluid flow through the inlet and a second position in which the valve element contacts the additional valve seat to prevent fluid flow through the outlet, the valve being structured so that the travel distance is adjustable and to allow fluid flow through the inlet when the valve element is moving away from the valve seat.

20. The valve of claim 19 wherein the relative position of the valve seat and the additional valve seat adjustable.

21. The valve of claim 19 which further comprises a bias member adapted to contact the valve element and to bias the valve element to contact the valve seat.

* * * * *